(12) United States Patent
Van Lieshout et al.

(10) Patent No.: US 9,131,413 B2
(45) Date of Patent: Sep. 8, 2015

(54) METHOD AND APPARATUS FOR CONFIGURING RADIO ACCESS FUNCTIONALITY OF A WIRELESS COMMUNICATION UNIT

(75) Inventors: Gert-Jan Van Lieshout, Apeldoorn (NL); Himke Van Der Velde, Zwolle (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 13/500,528

(22) PCT Filed: Oct. 1, 2010

(86) PCT No.: PCT/KR2010/006718
§ 371 (c)(1),
(2), (4) Date: Apr. 5, 2012

(87) PCT Pub. No.: WO2011/043561
PCT Pub. Date: Apr. 14, 2011

(65) Prior Publication Data
US 2012/0202478 A1    Aug. 9, 2012

(30) Foreign Application Priority Data
Oct. 5, 2009    (GB) .................................. 0917394.9

(51) Int. Cl.
*H04W 36/14* (2009.01)
*H04W 36/00* (2009.01)

(52) U.S. Cl.
CPC .................................. *H04W 36/0055* (2013.01)

(58) Field of Classification Search
USPC ........... 455/414.4, 417, 418, 419, 432.2, 511, 455/436–439; 370/395.5, 466–469, 331, 370/332
See application file for complete search history.

(56) References Cited

U.S. PATENT DOCUMENTS

| | | | |
|---|---|---|---|
| 6,795,704 B1 * | 9/2004 | Hardin ........................ | 455/432.3 |
| 7,653,076 B2 * | 1/2010 | Gong et al. ................... | 370/401 |
| 8,000,704 B2 * | 8/2011 | Arkko et al. ............... | 455/435.1 |
| 8,027,679 B2 * | 9/2011 | Prasad ......................... | 370/331 |
| 2003/0081578 A1 * | 5/2003 | White et al. .................. | 370/338 |
| 2006/0089127 A1 * | 4/2006 | Muratsu ........................ | 455/411 |
| 2007/0263575 A1 * | 11/2007 | Choe ............................. | 370/338 |
| 2008/0069095 A1 | 3/2008 | Park et al. | |
| 2009/0036134 A1 * | 2/2009 | Ryu et al. ..................... | 455/437 |
| 2009/0168698 A1 | 7/2009 | Weniger et al. | |
| 2010/0008328 A1 * | 1/2010 | Maheshwari et al. ........ | 370/331 |
| 2010/0113067 A1 * | 5/2010 | Fullam et al. .............. | 455/456.3 |

* cited by examiner

*Primary Examiner* — Cong Tran
(74) *Attorney, Agent, or Firm* — Jefferson IP Law, LLP

(57) ABSTRACT

A method for configuring radio access functionality of a wireless communication unit within a wireless communication network, the method comprising sending to the wireless communication unit an indication of a required radio access protocol version to which the wireless communication unit is to be reconfigured.

17 Claims, 15 Drawing Sheets

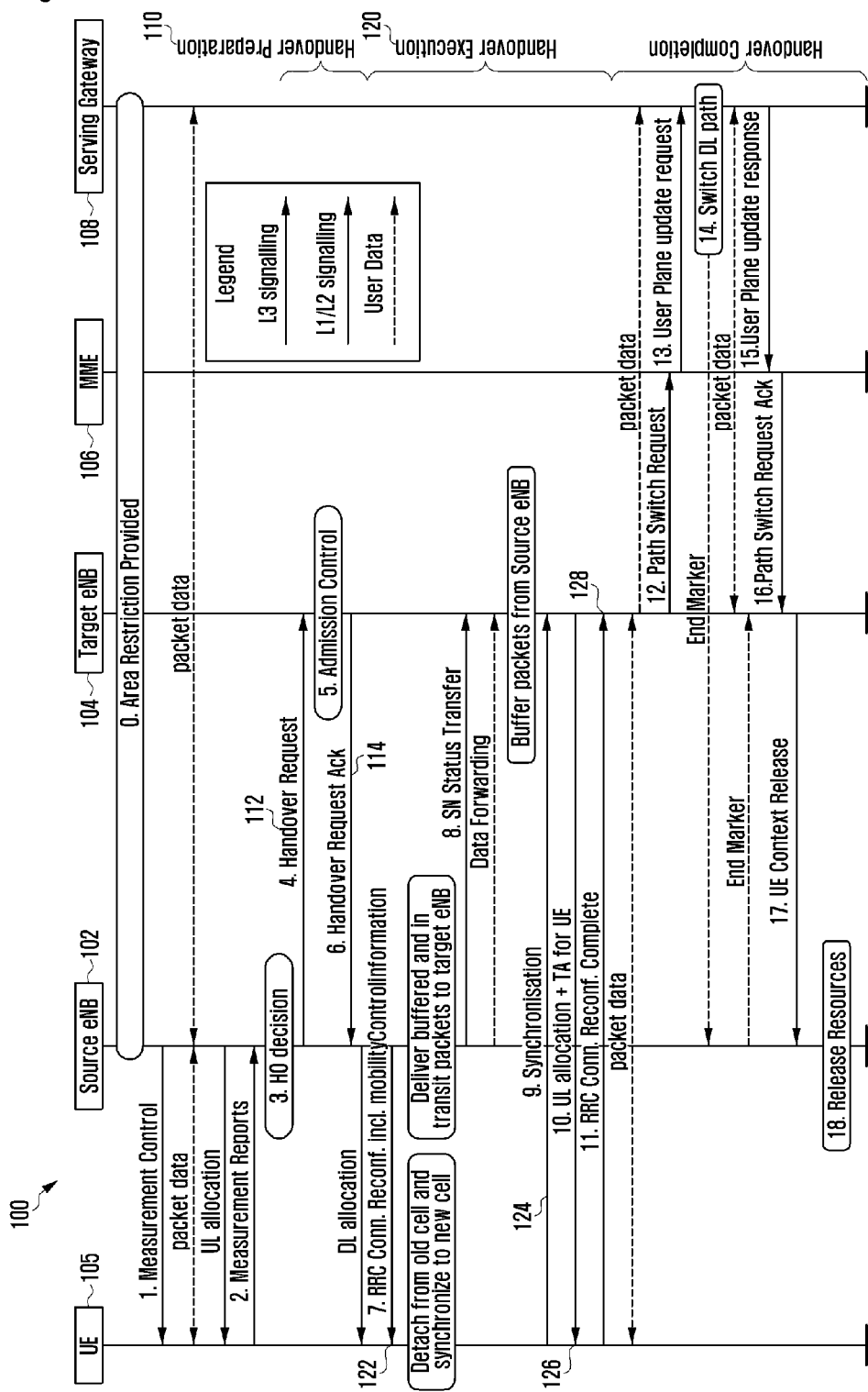

Fig. 2

```
-- Extract from TS 36.331, 6.2.2: Message definitions

RRCConnectionReconfiguration ::=        SEQUENCE {
    rrc-TransactionIdentifier               RRC-TransactionIdentifier,
    criticalExtensions                      CHOICE {
        c1                                      CHOICE{
            rrcConnectionReconfiguration-r8         RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture                SEQUENCE {}
    }
}

RRCConnectionReconfiguration-r8-IEs ::= SEQUENCE {
    measConfig                      MeasConfig                              OPTIONAL,   -- Need ON
    mobilityControlInfo             MobilityControlInfo                     OPTIONAL,   -- Cond HO
    dedicatedInfoNASList            SEQUENCE (SIZE(1..maxDRB)) OF
                                        DedicatedInfoNAS
    radioResourceConfigDedicated    RadioResourceConfigDedicated            OPTIONAL,   -- Cond HO-toEUTRA
    securityConfigHO                SecurityConfigHO                        OPTIONAL,   -- Cond HO
    nonCriticalExtension            SEQUENCE { }                            OPTIONAL    -- Need OP
}
```

Fig. 3

```
-- Extract from TS 36.331, 6.3: RRC information elements
RadioResourceConfigDedicated ::=   SEQUENCE {
    srb-ToAddModList                   SRB-ToAddModList           OPTIONAL,      -- Cond HO-Conn
    drb-ToAddModList                   DRB-ToAddModList           OPTIONAL,      -- Cond HO-toEUTRA
    drb-ToReleaseList                  DRB-ToReleaseList          OPTIONAL,      -- Need ON
    mac-MainConfig                     CHOICE {
        explicitValue                      MAC-MainConfig,
        defaultValue                       NULL
    }                                                             OPTIONAL,      -- Cond HO-toEUTRA2
    sps-Config                         SPS-Config                 OPTIONAL,      -- Need ON
    physicalConfigDedicated            PhysicalConfigDedicated    OPTIONAL,      -- Need ON
    ...
}
```

300

310

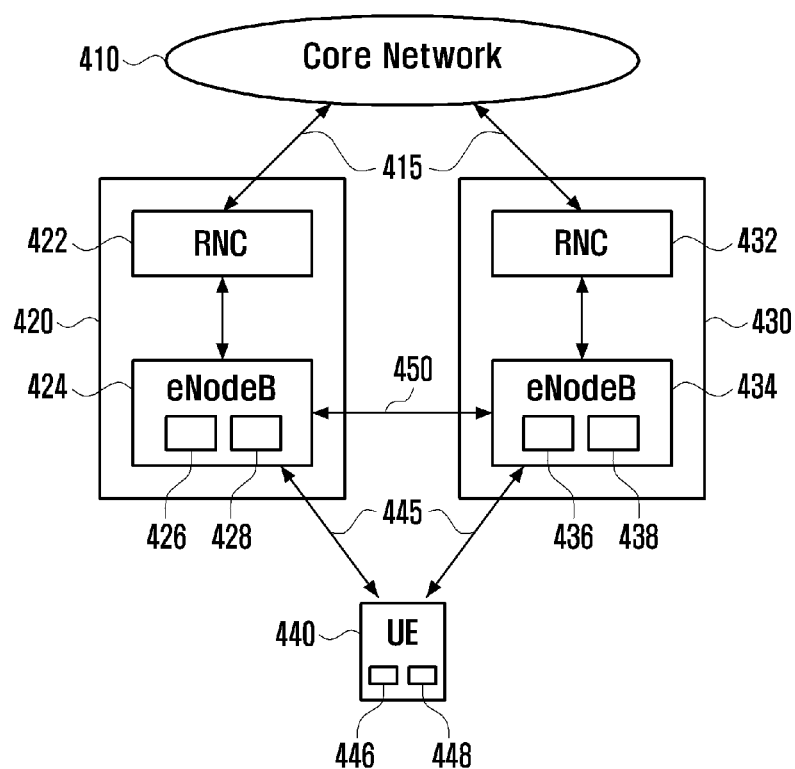

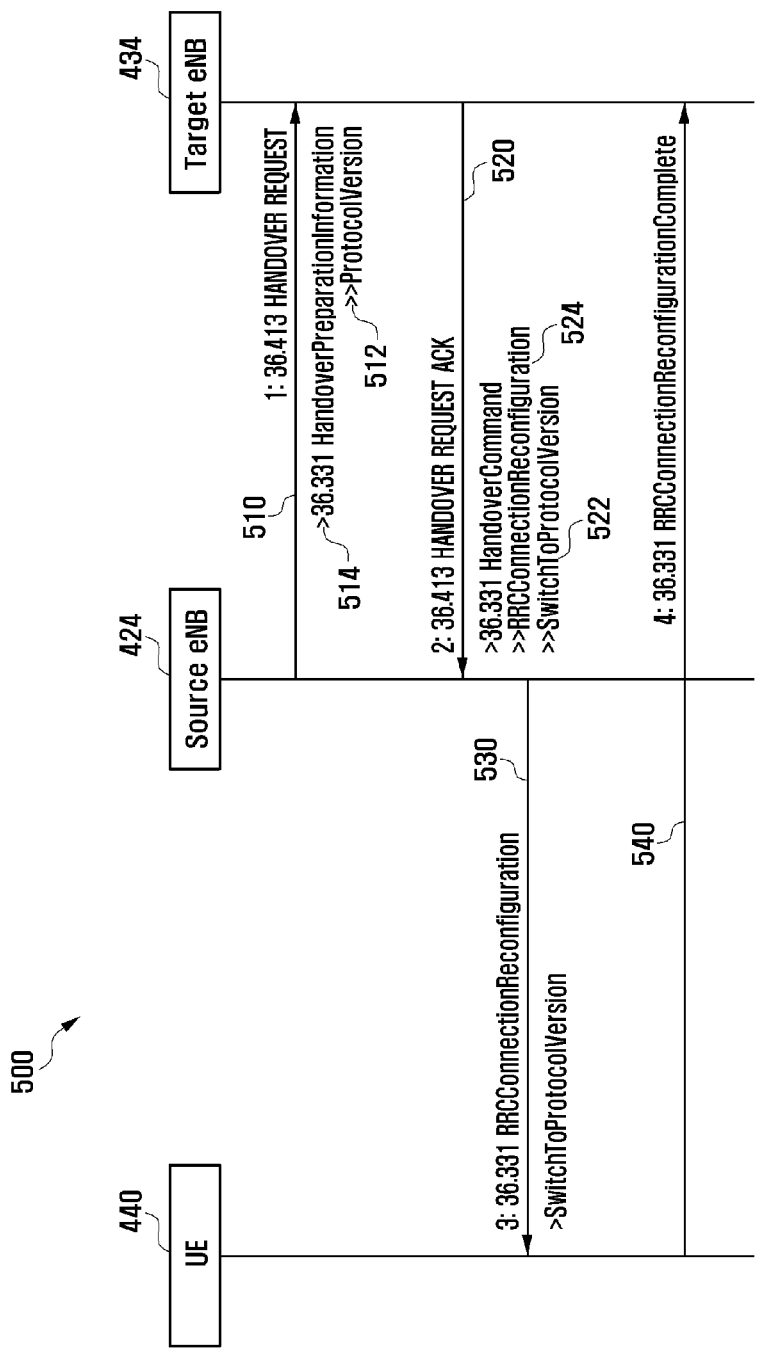

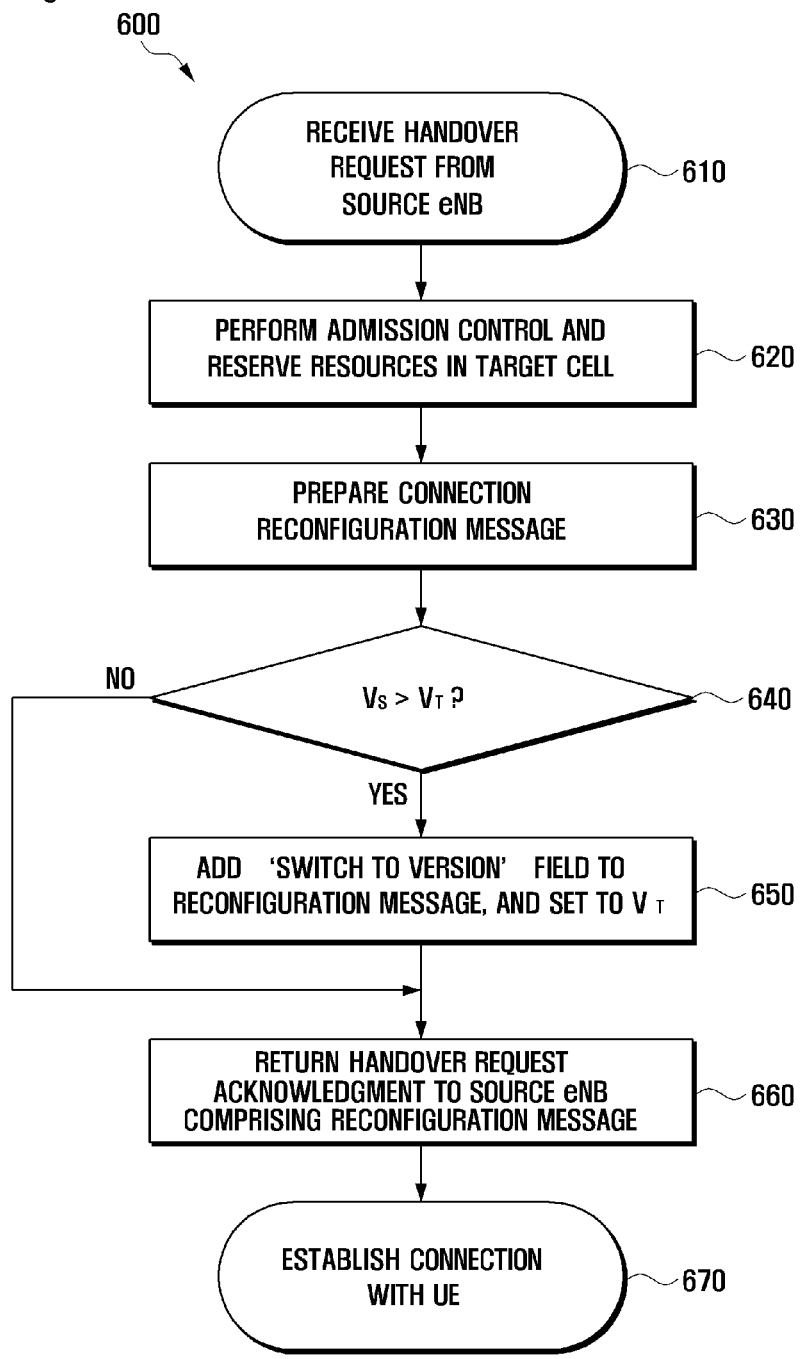

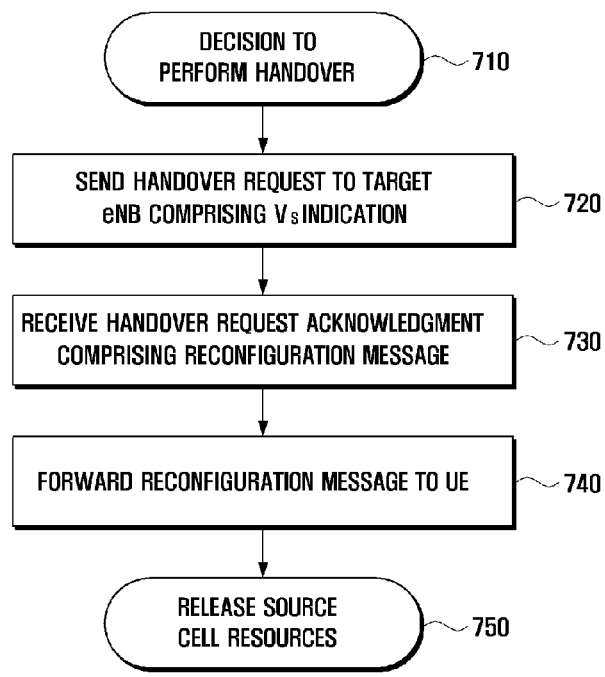
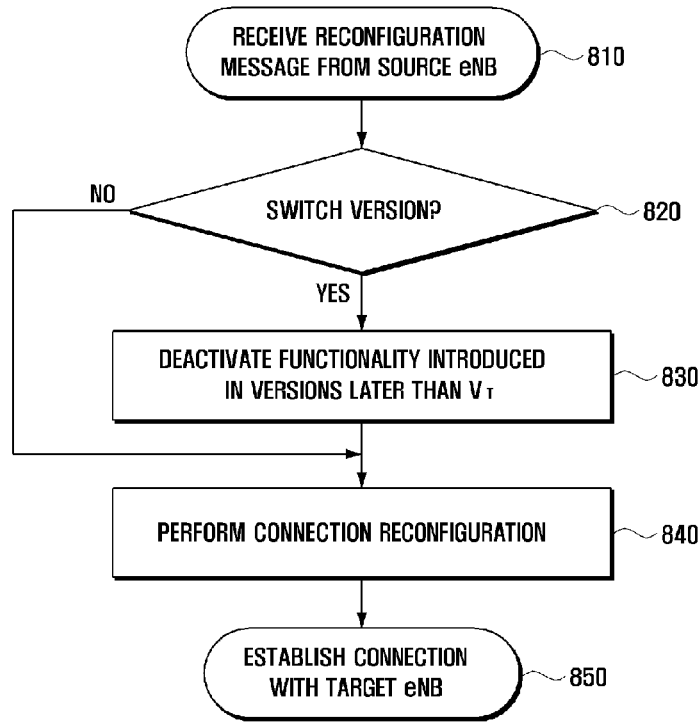

Fig. 11

```
- Extract from 10.2.2: Message definitions

HandoverPreparationInformation ::= SEQUENCE {
    criticalExtensions              CHOICE {
        c1                              CHOICE{
            handoverPreparationInformation-r8   HandoverPreparationInformation-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE { }
    }
}

HandoverPreparationInformation-r8-IEs ::= SEQUENCE {
    ue-RadioAccessCapabilityInfo    UE-CapabilityRAT-ContainerList,
    as-Config                       AS-Config                                       OPTIONAL,   -- Cond HO
    rrm-Config                      RRM-Config                                      OPTIONAL,
    as-Context                      AS-Context                                      OPTIONAL,   -- Cond HO
    v9x0NonCriticalExtension        HandoverPreparationInformation-v9x0-IEs         OPTIONAL
}

HandoverPreparationInformation-v9x0-IEs ::= SEQUENCE {
    protocolVersion ~1112           INTEGER [1..31],
    nonCriticalExtension            SEQUENCE { }                                    OPTIONAL
}
```

```
-- Extract from 6.2.2: Message definitions

RRCConnectionReconfiguration ::=   SEQUENCE {
    rrc-TransactionIdentifier          RRC-TransactionIdentifier,
    criticalExtensions                 CHOICE {
        c1                                 CHOICE{
            rrcConnectionReconfiguration-r8    RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture           SEQUENCE {}
    }
}

RRCConnectionReconfiguration-r8-IEs ::= SEQUENCE {
    measConfig                         MeasConfig                               OPTIONAL,
    mobilityControlInfo                MobilityControlInfo                      OPTIONAL,
    dedicatedInfoNASList               SEQUENCE (SIZE(1..maxDRB)) OF
                                       DedicatedInfoNAS                         OPTIONAL,  -- Cond nonHO
    radioResourceConfigDedicated       RadioResourceConfigDedicated             OPTIONAL,  -- Cond HO-toEUTRA
    securityConfigHO                   SecurityConfigHO                         OPTIONAL,  -- Cond HO
    v9x0NonCriticalExtension           RRCConnectionReconfiguration-v9x0-IEs    OPTIONAL
    -- Need OP
}

RRCConnectionReconfiguration-v9x0-IEs ::= SEQUENCE {
    switchToProtocolVersion   1222     INTEGER (1..31),
    nonCriticalExtension               SEQUENCE {}                              OPTIONAL
}
```

```
Extract from 6.2.2: Message definitions

RRCConnectionReestablishment ::=    SEQUENCE {
    rrc-TransactionIdentifier           RRC-TransactionIdentifier,
    criticalExtensions                  CHOICE {
        c1                              CHOICE{
            rrcConnectionReestablishment-r8    RRCConnectionReestablishment-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE { }
    }
}

RRCConnectionReestablishment-r8-IEs ::=    SEQUENCE {
    radioResourceConfigDedicated        RadioResourceConfigDedicated,
    nextHopChainingCount                NextHopChainingCount,
    v9x0NonCriticalExtension            RRCConnectionReestablishment-v9x0-IEs         OPTIONAL
    -- Need OP
}

RRCConnectionReconfiguration-v9x0-IEs ::=    SEQUENCE {
    switchToProtocolVersion    1222    INTEGER (1..31),
    nonCriticalExtension                SEQUENCE { }                                  OPTIONAL
}
```

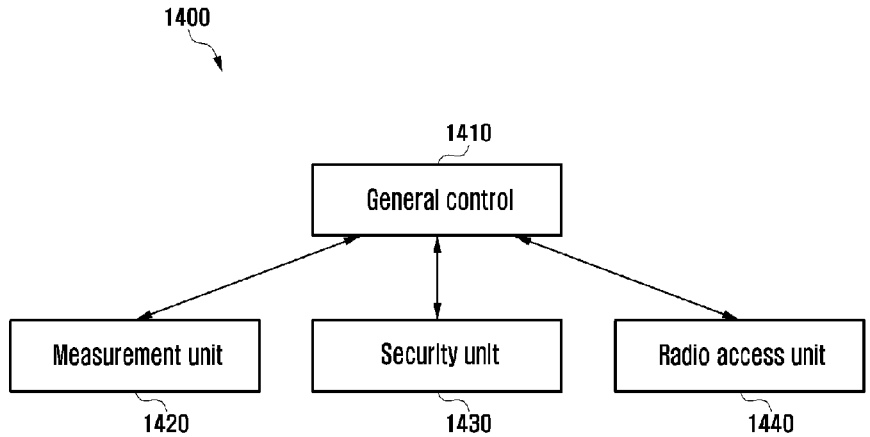

```
-- Extract from TS 36.331, 6.3: RRC information elements

PhysicalConfigDedicated ::=    SEQUENCE {
    pdsch-ConfigDedicated              PDSCH-ConfigDedicated           OPTIONAL,  -- Need ON
    pucch-ConfigDedicated              PUCCH-ConfigDedicated           OPTIONAL,  -- Need ON
    pusch-ConfigDedicated              PUSCH-ConfigDedicated           OPTIONAL,  -- Need ON
    uplinkPowerControlDedicated        UplinkPowerControlDedicated     OPTIONAL,  -- Need ON
    tpc-PDCCH-ConfigPUCCH              TPC-PDCCH-Config                OPTIONAL,  -- Need ON
    tpc-PDCCH-ConfigPUSCH              TPC-PDCCH-Config                OPTIONAL,  -- Need ON
    cqi-ReportConfig                   CQI-ReportConfig                OPTIONAL,  -- Need ON
    soundingRS-UL-ConfigDedicated      SoundingRS-UL-ConfigDedicated   OPTIONAL,  -- Need ON
    antennaInfo                        CHOICE {
        explicitValue                      AntennaInfoDedicated,
        defaultValue                       NULL
    }                                                                  OPTIONAL,  -- Need ON
    schedulingRequestConfig            SchedulingRequestConfig         OPTIONAL,  -- Need ON
    ...,
    physicalConfigDedicated-v9x0       PhysicalConfigDedicated-v9x0    OPTIONAL   -- Need ON
}

PhysicalConfigDedicated-v9x0 ::=  SEQUENCE {
    functionX-Config-v9x0              FunctionX-Config                OPTIONAL,  -- Need OR
    functionY-Config-v10x0             FunctionY-Config                OPTIONAL,  -- Need OR
    nonCriticalExtension               SEQUENCE { }
}

FunctionX-Config ::=           SEQUENCE {
    x-Config                           SEQUENCE {
        field1                             ENUMERATED {val1, val2},
        field2                             INTEGER [1..8]
    }                                                                  OPTIONAL   -- Need ON
}
```

METHOD AND APPARATUS FOR CONFIGURING RADIO ACCESS FUNCTIONALITY OF A WIRELESS COMMUNICATION UNIT

TECHNICAL FIELD

The field of this invention relates to a method and apparatus for configuring radio access functionality of a wireless communication unit. The invention is applicable to, but not limited to, a method for configuring radio access functionality of a wireless communication within a 3rd Generation Partnership Project (3GPP) evolved universal terrestrial radio access network, a network entity, a wireless communication unit and a wireless communication network therefor.

BACKGROUND ART

In the field of cellular communication systems, for example cellular communication systems conforming to 3rd Generation Partnership Project (3GPP) specifications, typically the network controls the mobility of a mobile communication unit (or user equipment (UE) in 3GPP parlance) that is in a connected mode (or to be precise in 3GPP terms in an RRC_CONNECTED state). For example, the network decides with which cell the UE maintains a radio connection (also referred to as the serving cell). The network applies the handover procedure to move the UE from one cell, namely the serving cell, to another cell, referred to as the target cell. The network decides the cell, as well as the Radio Access Technology (RAT) in some circumstance, that the UE should connect to typically based on radio quality. However, the network may also take into account other factors, such as cell load, UE capabilities, the type of bearers that are (being) established, etc. To assist the handover decision process, the network normally configures the UE to perform measurements on a serving frequency for its current serving cell (referred to as intra-frequency measurements), on other frequencies used by the Radio Access Technology for that network (referred to as inter-frequency measurements) and/or on frequencies used by other Radio Access Technologies (referred to as inter-RAT measurements).

FIG. 1 illustrates an example of a typical overall handover procedure 100 for a UE 105. More specifically FIG. 1 illustrates an Intra-MME (Mobility Management Entity)/Serving Gateway handover as defined in the 3GPP Technical Specification (TS) 36.300.

Once a decision has been made to perform a handover, the handover procedure 100 starts with a preparation stage 110 comprising a source eNB 102 (enhanced NodeB) forwarding a HANDOVER REQUEST message 112, as defined in 3GPP TS 36.413, to a target eNB 104, the HANDOVER REQUEST message 112 comprising handover preparation information needed to prepare for the handover. The HANDOVER REQUEST message 112 carries the handover preparation information within a HandoverPreparationInformation message, defined in 3GPP TS 36.331, and includes:
  radio access capabilities for the UE;
  a current radio access (e.g. access stratum, AS) configuration;
  RRM (Radio Resource Management) configuration, such as information kept only by the eNB that is used primarily for Radio Resource Management (where usage of such RRM configuration information is eNB implementation-dependent); and
  radio access (AS) context, i.e. information kept only by the eNB (i.e. information that is not exchanged across the radio interface), such as information needed to perform RRC (Radio Resource Control) connection re-establishment.

If the target eNB 104 accepts the handover, it reserves the radio resources and decides on the details of the radio access configuration to be used by the UE 105 in the target cell. This radio access configuration is returned to the source eNB 102 within a HANDOVER REQUEST ACK message 114, as defined in 3GPP TS 36.413. This HANDOVER REQUEST ACK message 114 carries the radio access configuration within a HandoverCommand message, that is defined in 3GPP TS 36.331. The HandoverCommand message again carries an RRCConnectionReconfiguration message, as defined in 3GPP TS 36.331. When used to perform a handover within, say, E-UTRA, this message includes the radio access configuration to be used in the target cell, such as:
  the measurement configuration, expressed by way of a 'delta' compared to the configuration used in the source cell (the delta indicating configuration changes, as opposed to complete configuration information, in order to reduce the size of the message);
  the mobility control information, which specifies the target cell identity (by means of a cell identity) and some characteristics (such as a frequency, a bandwidth and additional spectrum emission information; only if different from what is used in the source cell, i.e. delta signaling information is provided), the new radio access identity to be used in the target cell, the cell-specific radio resource configuration (common for all UEs), dedicated resources used for initial access in the target cell and a timer to limit the duration that the UE tries connecting to the target cell;
  the UE-specific radio resource configuration (i.e. the dedicated radio configuration), also expressed as a delta, compared to the configuration used in the source cell; and
  the security configuration, i.e. the algorithms, if different from the ones used in the source cell (delta), as well as parameters affecting the derivation of radio access security keys (i.e. an indication whether a new base key is to be used and a counter that is incremented upon every handover).

After the preparation stage 110, handover execution is performed as illustrated generally at 120, whereby the source eNB 102 proceeds with the handover, which includes the source eNB 102 transparently forwarding a RRCConnectionReconfiguration message 122 to the UE 105 (i.e. it does not change the message contents; the source eNB does however perform integrity protection and ciphering of the message), and the UE 105 attempting to connect to the target cell (steps 124, 126), and returning a RRCConnectionReconfigurationComplete message 128, as defined in 3GPP TS 36.331.

The signaling used upon handover, as defined in 3GPP TS 36.331 to a large extent applies delta signaling for the various parameters, or fields in 3GPP parlance, whereby the radio access network (Evolved Universal Terrestrial Radio Access Network? EUTRAN in the case of 3GPP TS 36.331) only signals values that change from those used in the source cell. 3GPP TS 36.331 specifies the signaling (the Protocol Data Unit content) by means of ASN.1. Fields for which delta signaling applies are defined as optional, so they may be absent, in combination with a need code of 'ON' whereby in case of absence the receiver takes no action with respect to such fields, and where applicable continues to use the existing value (and/or associated functionality). FIG. 2 illustrates an example 200 of a message definition for RRCConnectionReconfiguration messages in accordance with 3GPP TS 36.331.

For the example illustrated in FIG. 2, the field measConfig 210 is defined as being OPTIONAL (at 220), with a need code of 'ON' (at 230). It should be noted that whilst the example illustrated in FIG. 2 only shows the fields present at the message level, similar considerations with regard to fields being defined as 'optional' with need codes of 'ON' apply at other levels. For example, FIG. 3 illustrates an example 300 of a definition for a RadioResourceConfigDedicated information element (IE) (in accordance with 3GPP TS 36.331) comprising several optional fields with need codes set to 'ON'.

Whilst the use of delta signaling in this manner enables a significant reduction in the signaling overhead required when a handover is performed, it also creates issues with respect to backward compatibility when a target eNB is arranged to support an earlier release of the radio access protocols than a version supported by both the serving eNB and UE.

For optional fields with a need code of 'ON', explicit signaling is required to deactivate functionality associated with that field, such as for backward compatibility purposes, as applies when the target eNB does support the concerned functionality. For example, in the case where, say, the spsConfig field 310 illustrated in FIG. 3 is absent in a RadioResourceConfigDedicated identity element (IE), the UE will continue to use previously configured values. Accordingly, in order to deactivate previously active functionality, it is necessary to include the appropriate fields in a manner that is suitable to 'clear' the previously configured values.

The RRC protocol defined in 3GPP TS 36.331 includes different kinds of protocol extensions that may be added for later versions of the specifications, of which there are two prime categories: non-critical extensions (NCE) and critical extensions (CE). It has been agreed that the non-critical extension mechanism is the primary extension mechanism, since it just adds on to the existing signaling. This, for example, means that when a message is received that includes non-critical extensions that are not comprehended by the receiver, the message may be processed as if the extensions were not present. In contrast, a message that includes critical extensions that are not comprehended is completely ignored by the receiver. Such critical and non-critical extensions are provided in various different manners:

defining new message types;
    defining a new message version;
    adding an optional open SEQUENCE at the end of a message or within a size-delimited container e.g. a bit string;
    extending the values of a field of ENUMERATED type by using a value previously defined as spare or by adding a new value after an extension marker;
    extending the values of a field of CHOICE type by using a value previously defined as spare or by adding a new value after an extension marker;
    extending a field of SEQUENCE type by adding new fields after an extension marker;
    etc.

DISCLOSURE OF INVENTION

Technical Problem

Currently there is no defined way for a target eNB to deactivate radio access configuration functions that are introduced in a protocol version not supported by the target eNB. If the UE continues using the concerned functions, severe interoperability problems are likely to occur.

Thus, a need exists for an improved mechanism for configuring radio access functionality of a wireless communication unit.

Solution to Problem

Accordingly, the invention seeks to mitigate, alleviate or eliminate one or more of the above mentioned disadvantages singly or in any combination. Aspects of the invention provide a network entity, a wireless communication unit, a wireless communication network, and a method therefor as described in the appended claims.

According to a first aspect of the invention, there is provided a method for configuring radio access functionality of a wireless communication unit within a wireless communication network, the method comprising, at a radio access network entity, sending to the wireless communication unit an indication of a required radio access protocol version to which the wireless communication unit is to be reconfigured.

Thus, in one example embodiment of the invention, the network entity is able to (re)configure radio access functionality that is active within the wireless communication unit in accordance with a required radio access protocol version. For example, the network entity is able to configure the wireless communication unit to deactivate radio access functionality introduced in later versions of the radio access protocol, relative to that version supported by the network entity (the required version), even though the network entity does not recognise such functionality.

According to an optional feature of the invention, the method comprises receiving from a source network entity a handover request for a wireless communication unit; and sending to the wireless communication unit an indication of a target radio access protocol version to which the wireless communication unit is to be configured. In this manner, the network entity is able to configure the wireless communication unit to deactivate radio access functionality introduced in later versions of the radio access protocol relative to the target version supported by that network entity (the required version), even though the network entity does not recognise such functionality.

According to an optional feature of the invention, the method further comprises determining, upon receipt of a handover request, at least one of a source network entity radio access protocol version and a wireless communication unit radio access protocol version, and if the at least one determined source network entity and wireless communication unit radio access protocol version comprises a version later than a supported radio access protocol version, sending to the wireless communication unit an indication of a target radio access protocol version to which the wireless communication unit is to be configured. For example, the method may comprise, upon receipt of a handover request, determining a source network entity radio access protocol version and a wireless communication unit radio access protocol version, and if the source network entity radio access protocol version and the wireless communication unit radio access protocol version comprise versions later than the supported radio access protocol version, sending to the wireless communication unit an indication of a target radio access protocol version to which the wireless communication unit is to be configured. In this manner, the wireless communication unit may only be sent an indication of a required radio access protocol version to which it is to be reconfigured when it is determined that a source network entity radio access protocol version and/or a wireless communication unit radio access protocol version is a later version than that supported by the target network entity, potentially avoiding unnecessary reconfiguration of the radio access functionality of the wireless communication unit.

According to an optional feature of the invention, the step of determining at least one of a source network entity radio access protocol version and a wireless communication unit radio access protocol may comprise reading a field within a received HANDOVER REQUEST message. The field is arranged to comprise an indication of at least one of a supported radio access protocol version for a source network entity from which the handover request was received; a supported radio access protocol version for the wireless communication unit; and a latest radio access protocol version in which active functionality of the wireless communication unit is introduced.

According to an optional feature of the invention, the field within the received HANDOVER REQUEST message may form a part of a HandoverPreparationInformation message contained within the HANDOVER REQUEST message.

According to an optional feature of the invention, determining a source network entity radio access protocol version may comprise looking up, within Operation and Maintenance (O&M) configuration information, a supported radio access protocol version for a source network entity from which the handover request was received.

According to an optional feature of the invention, the target radio access protocol version of which an indication is sent to the wireless communication unit may comprise a latest supported radio access protocol version.

According to an optional feature of the invention, the target radio access protocol version of which an indication is sent to the wireless communication unit may comprise a latest supported radio access protocol version from a subset of radio access protocol versions.

According to an optional feature of the invention, sending to the wireless communication unit an indication of a target radio access protocol version to which the wireless communication unit is to be configured may comprise adding the indication of the target radio access protocol within a field of a connection reconfiguration message to be contained within a HANDOVER REQUEST ACK message returned to the source network entity.

According to an optional feature of the invention, sending to the wireless communication unit an indication of a target radio access protocol version to which the wireless communication unit is to be configured may comprise adding the indication of the target radio access protocol within a field of a connection re-establishment message to be sent to the wireless communication unit in response to receiving a connection reestablishment request message from the wireless communication unit.

According to an optional feature of the invention, the method may comprise receiving an indication of a required change to a radio access protocol version for which the wireless communication unit is configured to comply with and sending to the wireless communication unit an indication of a required radio access protocol version to which the wireless communication unit is to switch to.

According to an optional feature of the invention, the wireless communication network may comprise an evolved universal terrestrial radio access network (E-UTRAN).

According to a second aspect of the invention, there is provided a computer program product comprising executable program code for configuring radio access functionality of a wireless communication unit within a wireless communication network, the executable program code operable for sending to the wireless communication unit an indication of a required radio access protocol version to which the wireless communication unit is to be reconfigured.

According to a third aspect of the invention, there is provided a network entity for supporting radio access to a wireless communication network, the network entity comprising a signal processing module arranged to send to the wireless communication unit an indication of a required radio access protocol version to which the wireless communication unit is to be reconfigured.

According to a fourth aspect of the invention there is provided a method for configuring radio access functionality of a wireless communication unit within a wireless communication network, the method comprising sending to a target network entity a handover request for a wireless communication unit, the handover request comprising an indication of at least one of a source network entity radio access protocol version and a wireless communication unit radio access protocol version.

According to a fifth aspect of the invention there is provided a computer program product comprising executable program code for configuring radio access functionality of a wireless communication unit within a wireless communication network, executable program code operable for sending to a target network entity a handover request for a wireless communication unit, the handover request comprising an indication of at least one of a source network entity radio access protocol version and a wireless communication unit radio access protocol version.

According to a sixth aspect of the invention there is provided a network entity for supporting radio access to a wireless communication network, the network entity comprising a signal processing module arranged to send to a target network entity a handover request for a wireless communication unit, the handover request comprising an indication of at least one of a source network entity radio access protocol version and a wireless communication unit radio access protocol version.

According to a seventh aspect of the invention there is provided a method for configuring radio access functionality of a wireless communication unit within a wireless communication network, the method comprising, at the wireless communication unit, receiving an indication of a required radio access protocol version to which the wireless communication unit is to be reconfigured, and deactivating radio access functionality introduced in radio access protocol versions later than the indicated required radio access protocol version.

According to an eighth aspect of the invention there is provided a computer program product comprising executable program code for configuring radio access functionality of a wireless communication unit within a wireless communication network, the executable program code operable for receiving an indication of a required radio access protocol version to which the wireless communication unit is to be reconfigured, and deactivating radio access functionality introduced in radio access protocol versions later than the indicated required radio access protocol version.

According to a ninth aspect of the invention there is provided a wireless communication unit for connecting to a wireless communication network, the wireless communication unit comprising a signal processing module arranged to receive an indication of a required radio access protocol version to which the wireless communication unit is to be reconfigured, and deactivate radio access functionality introduced in radio access protocol versions later than the indicated required radio access protocol version.

According to a tenth aspect of the invention there is provided a wireless communication network comprising a network entity for supporting radio access to the wireless communication network, the network entity comprising a signal processing module arranged to send to the wireless communication unit an indication of a required radio access protocol version to which the wireless communication unit is to be reconfigured.

These and other aspects of the invention will be apparent from, and elucidated with reference to, the example embodiments described hereinafter.

Advantageous Effects of Invention

The present invention advantageously provides at least some of the following benefits over possible solutions currently available:

(i) additional handover delay introduced through the source eNB deactivating functionality introduced in later protocol versions that that supported by the target eNB is substantially avoided;

(ii) the target eNB is able to cause the UE to deactivate unsupported functionality without the need for the target eNB to explicitly signal deactivation of such functionality;

(iii) the need for all fields to always be included within signaling for functionality that is required to b continued following handover (as would be required if all functionality defined using optional fields with need code set to OR), and the associated signaling overhead, is substantially avoided; and (iv) the need to significantly extend a radio access protocol, such as to define multiple default values as would be required to support switching to default configurations, is substantially avoided.

BRIEF DESCRIPTION OF DRAWINGS

Further details, aspects and example embodiments of the invention will be described, by way of example only, with reference to the drawings. Elements in the figures are illustrated for simplicity and clarity and have not necessarily been drawn to scale. Like reference numerals have been included in the respective drawings to ease understanding.

FIG. 1 illustrates an example of a typical overall handover procedure.

FIG. 2 illustrates an example of a message definition for RRCConnectionReconfiguration messages.

FIG. 3 illustrates an example of a definition for a RadioResourceConfigDedicated information element.

FIG. 4 illustrates an example of a wireless communication network.

FIG. 5 illustrates a simplified example of a message sequence for a handover request in accordance with some example embodiments of the invention.

FIG. 6 illustrates an example of a simplified flowchart of a method for configuring radio access functionality of a wireless communication unit according to some example embodiments of the invention.

FIG. 7 illustrates an example of a simplified flowchart of a method for configuring radio access functionality of a wireless communication unit according to some example embodiments of a further aspect of the invention.

FIG. 8 illustrates an example of a simplified flowchart of a method for configuring radio access functionality of a wireless communication unit according to some example embodiments of a still further aspect of the invention.

FIGS. 11 to 13 illustrate examples of ASN.1 extracts for signaling details according to some example embodiments of the invention.

FIG. 14 illustrates an example of wireless communication unit radio access functionality according to some example embodiments of the invention.

FIG. 17 illustrates a further example of wireless communication unit radio access functionality according to some example embodiments of the invention with an optionality bit with need 'ON'.

MODE FOR THE INVENTION

Figure 9:
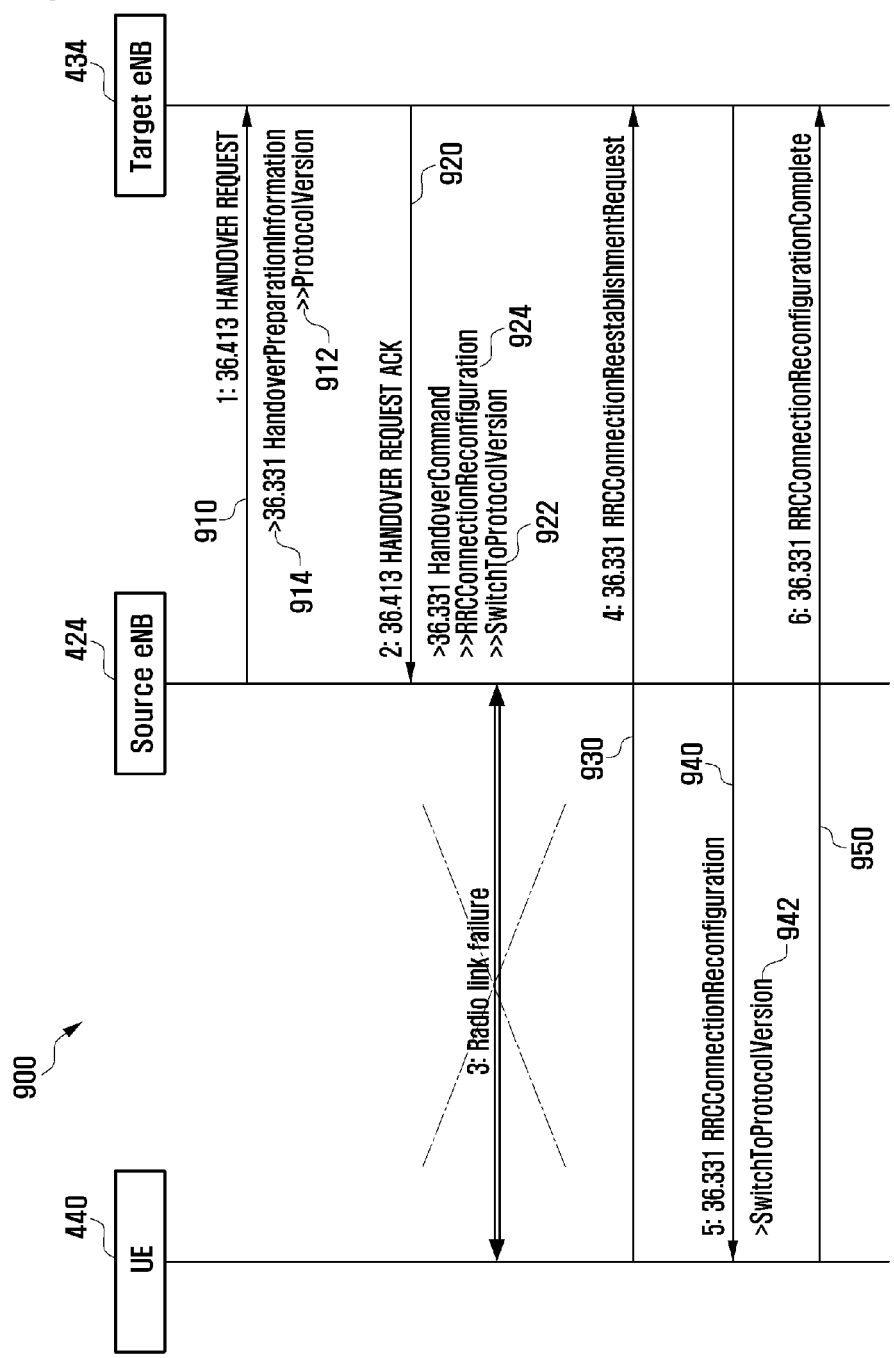
FIG. 9 illustrates a simplified example of a message sequence for a handover request in accordance with some alternative example embodiments of the invention.

Examples of the invention will be described in terms of a wireless communication network adapted in accordance with the 3rd Generation Partnership Project (3GPP) technical specifications, and in particular in terms of a wireless communication network comprising an evolved universal terrestrial radio access network (E-UTRAN). However, it will be appreciated by a skilled artisan that the inventive concept herein described may be implemented within any type of wireless radio access system. In a number of applications, the adaptation of a network entity such as a base transceiver station (or NodeB in 3GPP parlance) in accordance with the examples of the invention effectively performs a method for configuring radio access functionality of a wireless communication unit within a wireless communication network. The method comprises sending to the wireless communication unit an indication of a required radio access protocol version to which the wireless communication unit is to be reconfigured. In this manner, the network entity is able to (re)configure radio access functionality that is active within the wireless communication unit in accordance with a required radio access protocol version. For example, the network entity is able to configure the wireless communication unit to deactivate radio access functionality introduced in later versions of the radio access protocol relative to that version supported by the network entity (the required version), even though the network entity does not recognise such functionality.

In the context of the present invention, the term 'radio access protocol version', used hereinafter, is meant to encompass a specific release of a radio access protocol, and may further encompass a specific version of a release of a radio access protocol. The 3GPP technical specifications are developed in a step-wise manner. Periodically a new release of a technical specification is made available. By way of example, for the evolved universal terrestrial radio access (E-UTRA) technical specifications, the initial release is called release 8 (REL-8). The next release, release 9 (REL-9), has recently been made available and comprises several additional functions as compared with REL-8, such as IP (Internet Protocol) Multimedia Subsystem (IMS) emergency call, Multimedia Broadcast Multicast Service (MBMS) services, etc. In addition to the periodic release of new releases, typically every quarter of a year a new version of each release that is created comprises the most recent agreements for that release. Thus, it is contemplated that the term 'radio access protocol version' may relate to a specific release of a radio access protocol, for example REL-8 or REL-9 of the E-UTRA technical specifications, such as 3GPP TS 36.331, and/or to a specific version of a release, for example 3GPP TS 36.331 v8.7.0 for REL-8, or 3GPP TS 36.331 v9.0.0 for REL-9.

Possible solutions for releasing a previously configured functionality may include:

i) using a need code of 'OR' (when an optional field with a need code set to 'OR' is absent, the value is cleared);

ii) use of an optional field, which concerns a choice of release or setup values, so as to release a configured value, the field should be included but the choice set to release; and iii) for some fields it is possible to signal the UE to switch to using a default configuration for certain values/functionalities ? if the default configuration for a value/functionality comprises that value/functionality being cleared/deactivated, this could be used to cause the UE to clear/deactivate that value/functionality.

For the first of these methods for releasing a previously configured functionality, if that functionality is defined in later releases of the radio access protocols defined by means of optional fields with a need code set to 'OR', the functionality would automatically be released upon handover to a target eNB that only supports an earlier release of the specification (and hence does not include any of the fields added in later releases). Accordingly, it is possible to avoid the problem of deactivating unsupported functionality by using need codes set to 'OR' in this manner. However, such a technique requires the fields to always be included within signaling messages when the functionality is required to be continued following handover. This would typically result in a significantly increased signaling overhead, and requires careful application of guidelines in order to ensure need codes are set correctly, and to ensure fields are correctly included whenever the functionality is to be continued. The signaling overhead may be reduced by introducing an additional option for each field with a need code set to ON. In this manner, only two bits would need to be signaled to continue the corresponding functionality. However, such an approach would require careful application of specification guidelines, resulting in a high risk that errors may be made, and experience shows that specification guidelines are not always consistently (and correctly) applied.

For the second of the above methods for releasing a previously configured functionality, the functionality may be deactivated by explicit signaling, i.e. it requires that relevant fields are included and set to 'release'. A problem with this method is that it still requires explicit signaling to release the functionality, and hence legacy eNBs, i.e. those that support earlier releases of the radio access protocols, cannot release newer functionality since they are unaware of the necessary fields, etc.

For the third of the above methods of releasing a previously configured functionality, it is possible for the target eNB to configure the UE to apply a default configuration, whereby the UE is configured to only activate functionality defined in an initial release of the radio access protocols. Currently, signaling supports the switching to a default configuration only for parts of the configuration. To apply this generally, the protocol would have to be extended significantly. For example, switching to a first default value deactivates the new functional extensions that are part of the concerned configuration. At present default configurations are defined for several sub-fields of the dedicated radio resource configuration. For the other parts of the dedicated radio bearer configuration (DRB), such as the DRB configuration, there currently is no signaling support for switching to a default configuration. Also for other parts of the UE configuration, such as measConfig, securityConfig, switching to a default configuration is currently not supported. Moreover, for some parts of the configuration it may not be possible to support different scenarios by means of a single default. In other words, multiple default values may need to be defined.

Altogether, the current signaling support for switching to a default configuration does not offer a complete solution even if complemented by, say, release and re-establishment of DRBs and measurements. It is of course possible to extend the current signaling support (e.g. by adding default values for more (higher level) fields and/or by one top-level 'switch to default configuration'-option), although it may not be so easy to specify (one or more) suitable default configurations for all configuration parts covering all relevant scenario's.

Another option for deactivating functionality that is not supported by a target eNB is for the source eNB to deactivate the functionality prior to initiating the handover preparation. However, this solution has the drawbacks of the handover procedure being delayed, which may increase the handover failure rate, and of requiring that the source eNB be aware of the protocol version that is supported by the target eNB, which would complicate the operations and maintenance of the network.

It should be noted that the source eNB should not perform the deactivation of the functionality in parallel to the handover preparation. If the deactivation of the functionality were performed in parallel with the handover preparation, the UE might lose the radio connection before the source eNB was able to complete the deactivation of the concerned functions. In such a case, the radio access configuration in the UE would still include the unsupported functions while the configuration of the target eNB does not include these functions. Due to this mismatch, the re-establishment procedure could fail, in which case the recovery from the radio link failure would be delayed significantly.

Thus, none of the above methods provide a satisfactory way for a target eNB to deactivate radio access configuration functions introduced in protocol versions that are not supported by the target eNB. If the UE continues using the concerned functions severe interoperability problems may occur.

Referring now to FIG. 4, there is illustrated an example of a wireless communication network 400 comprising a core network 410, a first radio network subsystem 420 and a second radio network subsystem 430. Each of the radio network subsystems 420, 430 for the illustrated example comprises one or more radio network controllers (RNCs) 422, 432 operably coupled to the core network 410, with each RNC 422, 432 being further operably coupled to one or more base transceiver stations 424, 434, referred to as NodeBs in 3GPP parlance, and more specifically evolved NodeBs (eNBs) in E-UTRA parlance. Each base transceiver station 424, 434 is arranged to provide radio access to the wireless communication network 400 to enable wireless communication units, such as user equipment (UE) 440, to connect thereto, for example via an air (Uu) interface 445.

In accordance with some examples of the present invention, the wireless communication network 400 comprises a network entity for supporting radio access to the wireless communication network 400, such as a base transceiver station 424, 434, comprising a signal processing module arranged to send to a wireless communication unit an indication of a required radio access protocol version to which the wireless communication unit is to be configured. In this manner, the network entity is able to (re)configure radio access functionality that is active within the wireless communication unit in accordance with a required radio access protocol version.

In accordance with some examples of the present invention, a signal processing module of a first (target) network entity, such as one of base transceiver stations 424, 434, may be arranged to receive a handover request for a wireless communication unit from a second (source) network entity, and upon receipt of such a handover request, to send to the wireless communication unit an indication of a target radio access protocol version to which the wireless communication unit is to be configured. In this manner, the first (target) network entity is able to configure the wireless communication unit to deactivate radio access functionality introduced in later versions of the radio access protocol relative to the target version supported by that network entity (the required version), even though the network entity does not recognise such functionality. Such a target radio access protocol version may comprise any appropriate radio access protocol version.

Referring to FIG. 5, there is illustrated a simplified example of a message sequence 500 for a handover request in accordance with some example embodiments of the present invention. For the illustrated example, the message sequence 500 relates to part of a handover procedure for a wireless communication unit comprising UE 440 of FIG. 4 from a source network entity comprising base station transceiver (eNB) 424 to a target network entity comprising base station transceiver (eNB) 434.

The target radio access protocol version may comprise a latest version of the radio access protocol supported by the first (target) network entity eNB 434. In this manner, the eNB 434 is able to configure the UE 440 to deactivate radio access functionality introduced in later versions of the radio access protocol relative to that supported by the eNB 434, whilst enabling the most up-to-date functionality supported by the eNB 434 to remain active.

Alternatively, it is contemplated that that target radio access protocol version may comprise a latest radio access protocol supported by the eNB 434 from a subset of radio access protocol versions. For example, such a subset may comprise a limited number of versions, say one, from each release of the radio access protocol, such as in the case of the E-UTRA protocols versions 8.6.0 (for REL__8), v9.0.0 (for REL__9), etc of 3GPP TS 36.331. Alternatively, such a subset may comprise a range of or versions, such as from versions 8.6.0 of REL__8 to, say, version v10.6.0 of (in the future) release 10 (REL__10) of 3GPP TS 36.331. In this manner, the need for, say, UE 440 to support multiple versions of the radio access protocol is simplified.

It is contemplated that the target network entity, eNB 434 for the illustrated example, may send an indication of a target radio access protocol version to a wireless communication unit each time a handover request is received. Alternatively, upon receipt of a handover request, the signal processing module of the target network entity, e.g. signal processing module 436 for the illustrated example, may be arranged to determine a source network entity radio access protocol version, and to send to the wireless communication unit an indication of a target radio access protocol version if the determined source network entity radio access protocol version comprises a version later than a radio access protocol version supported by the target network entity. In this manner, the wireless communication unit is only sent an indication of a required radio access protocol version to which it is to be reconfigured when it is determined that a source network entity radio access protocol version is a later version than that supported by the target network entity, thereby potentially avoiding unnecessary reconfiguration of the radio access functionality of the wireless communication unit.

For example, the source network entity radio access protocol version may comprise a latest radio access protocol version supported by the source network entity, eNB 424 for the illustrated example, from which the handover request was received. In this manner, it may be assumed that the wireless communication unit to which the handover request relates, UE 440 for the illustrated example, only has active radio access functionality introduced in versions of the radio access protocol up to (and including) that latest version supported by the source network entity, eNB 424. As a result, if such a source network entity radio access protocol version comprises a version earlier than or equal to that supported by the target network entity, eNB 434, it may be assumed that all currently active radio access functionality of UE 440 is supported by the target eNB 434, and as such no reconfiguration of the radio access functionality of the UE 440 is necessary.

It is contemplated in one example that the latest supported radio access protocol version for the source network entity from which the handover request was received, eNB 424 for the illustrated example, may be provided within a field, illustrated as protocolVersion field 512, within a HANDOVER REQUEST message 510 sent by the source eNB 434, thereby enabling the target network entity, eNB 434 to determine such a source network entity radio access protocol version. For example, the protocolVersion field 512 may form part of a HandoverPreparationInformation message 514 contained within the HANDOVER REQUEST message 510. Alternatively, the latest supported radio access protocol version for the source network entity, eNB 424, may be available as part of the operations and maintenance (O&M) configuration information for the target network entity, for example as may be stored within a memory element 438 of eNB 434, and as such the source network entity radio access protocol version may be determined by looking up the latest supported radio access protocol version for the source eNB 434 within the O&M configuration information.

In accordance with some further alternative example embodiments of the present invention, it is contemplated that, upon receipt of a handover request, the signal processing module 436 of the target network entity, eNB 434, may alternatively be arranged to determine a wireless communication unit radio access protocol version, and to send to the wireless communication unit an indication of a target radio access protocol version if the determined wireless communication unit radio access protocol version comprises a version later than a radio access protocol version supported by the target network entity, eNB 434.

For example, the wireless communication unit radio access protocol version may comprise a latest radio access protocol version supported by the wireless communication unit, UE 440, to which the handover request relates. In this manner, UE 440 may have active radio access functionality introduced in versions of the radio access protocol up to (and including) that latest version supported by UE 440. As a result, if such a wireless communication unit radio access protocol version comprises a version earlier than or equal to that supported by the target network entity, eNB 343, it may be assumed that all currently active radio access functionality of UE 440 is supported by the target eNB 434, and as such no reconfiguration of the radio access functionality of the UE 440 is necessary.

Alternatively, the wireless communication unit radio access protocol version may comprise a latest radio access protocol version in which active functionality of the wireless communication unit is introduced. In this manner, it may be assumed that the UE 440 only has active radio access functionality introduced in versions of the radio access protocol up to (and including) that wireless communication unit radio access protocol version. As a result, if such a wireless communication unit radio access protocol version comprises a version earlier than or equal to that supported by the target network entity, eNB 343, it may be assumed that all currently active radio access functionality of UE 440 is supported by the target eNB 434, and as such no reconfiguration of the radio access functionality of the UE 440 is necessary.

The latest supported radio access protocol version for the wireless communication unit to which the handover request relates and/or the latest radio access protocol version in which active functionality of the wireless communication unit is introduced may be provided within a field within the HANDOVER REQUEST message sent by the source eNB 424, such as the protocol Version field 512 illustrated in FIG. 5, thereby enabling the target eNB 434 to determine such a wireless communication unit radio access protocol version.

In accordance with some still further example embodiments of the present invention, the signal processing module 436 of the target eNB 434 may be arranged to determine a source network entity radio access protocol version and a wireless communication unit radio access protocol version, and if the source network entity radio access protocol version and the wireless communication unit radio access protocol version comprise versions later than the supported radio access protocol version for the target eNB 434, to send to the wireless communication unit an indication of a target radio access protocol version to which the wireless communication unit is to be configured. In this manner, if one or other of (i) the source network entity radio access protocol version and (ii) the wireless communication unit radio access protocol version comprises a version earlier than or equal to that supported by the target network entity, eNB 343, it may be assumed that the wireless communication unit to which the handover relates, UE 440 for the illustrated example, only has active radio access functionality introduced in versions of the radio access protocol up to (and including) the earliest of the source network entity radio access protocol version and the wireless communication unit radio access protocol version, and thus only has active radio access functionality introduced in versions no later than that supported by the target eNB 343. Accordingly, it may be assumed that all currently active radio access functionality of UE 440 is supported by the target eNB 434, and as such no reconfiguration of the radio access functionality of the UE 440 is necessary.

In accordance with some example embodiments of the present invention, the target network entity, eNB 434, may send the indication of the target radio access protocol version to the wireless communication unit, UE 440, within a handover request acknowledgement, for example within a field, illustrated as SwitchToProtocolVersion field 522 of a connection reconfiguration message 524, contained within a HANDOVER REQUEST ACK message 520 returned to the source network entity, eNB 424, as illustrated in FIG. 5. The source eNB 424 subsequently and transparently forwards the connection reconfiguration message 524 to the UE 440, as illustrated at 530.

Upon receipt of the indication of a required radio access protocol version to which it is to be configured, which for the illustrated example embodiment is received within the connection reconfiguration message 530, the UE 440 is arranged to deactivate radio access functionality introduced in radio access protocol versions later than the indicated required radio access protocol version. In this manner, radio access functionality introduced in later radio access protocol versions may be deactivated within the UE 440 without the need to explicitly identify such functionality. For the example illustrated in FIG. 5, once the UE 440 has deactivated radio access functionality introduced in radio access protocol versions later than the indicated required radio access protocol version, and all other required reconfiguration, it sends a connection reconfiguration complete message 540 back to the target eNB 434, and the handover procedure is completed.

For the example message sequence diagram of FIG. 5, the source eNB and the target eNB are illustrated as comprising a direct (X2) communication interface, for example such as interface 450 illustrated in FIG. 4. However, if no such direct interface exists, the radio access information (for example the HandoverPreparationInformation messages and the HandoverCommand messages) may be transparently transferred via the core network 410, for example via S1 interfaces 415.

Referring now to FIG. 6, there is illustrated an example of a simplified flowchart 600 of a method for configuring radio access functionality of a wireless communication unit (UE) within a wireless communication network according to some example embodiments of the present invention. For example, the method of FIG. 6 may be performed by signal processing logic 436 of target eNB 434 by way of executable program code stored in memory element 438.

The method starts at step 610 with the receipt of a handover request from a source eNB 434. Next, in step 620, admission control in performed and resources are reserved within the target cell for the UE to which the handover request relates, and a connection reconfiguration message is then prepared in step 630. It is then determined, in step 640, whether a source network entity radio access protocol version (VS) comprises a version later than a supported (target) radio access protocol version (VT). Step 640 may additionally or alternatively comprise determining whether a wireless communication unit radio access protocol version comprises a version later than a supported radio access protocol version. If it is determined that the source network entity radio access protocol version (and/or the wireless communication unit radio access protocol version) comprises a version later than a supported radio access protocol version, the method moves on to step 650, and a SwitchToProtocolVersion field is added to the connection reconfiguration message comprising a indication of a required (target) radio access protocol version to which the UE is to be configured. The method then moves on to step 660, where a handover request acknowledgement is returned to the source eNB comprising the connection reconfiguration message to be forwarded to the UE, and the method then ends at step 670 with the establishment of a connection with the UE. Referring back to step 640, if it is determined that the source network entity radio access protocol version (and/or the wireless communication unit radio access protocol version) does not comprise a version later than a supported radio access protocol version, the method directly on to step 660, where a handover request acknowledgement is returned to the source eNB comprising the connection reconfiguration message to be forwarded to the UE, and the method then ends at step 670 with the establishment of a connection with the UE.

Referring now to FIG. 7, there is illustrated an example of a simplified flowchart 700 of a method for configuring radio access functionality of a wireless communication unit (UE) within a wireless communication network according to some example embodiments of the present invention. For example, the method of FIG. 7 may be performed by signal processing logic 426 of source eNB 424 by way of executable program code stored in memory element 428.

The method starts at step 710, with the decision to perform a handover of a UE from a source eNB to a target eNB. Next, in step 720, a handover request comprising an indication of at least one of a source network entity radio access protocol version and a wireless communication unit radio access protocol version is sent to the target eNB. A handover request acknowledgement is the received at step 730 comprising a connection reconfiguration message. The connection reconfiguration message is then forwarded to The UE in step 740, and the method ends at step 750 with source cell resources being released.

Referring now to FIG. 8, there is illustrated an example of a simplified flowchart 800 of a method for configuring radio access functionality of a wireless communication unit (UE) within a wireless communication network according to some example embodiments of the present invention. For example, the method of FIG. 8 may be performed by signal processing logic 446 of UE 440 by way of executable program code stored in a memory element 448.

The method starts at step 810 with the receipt of a connection reconfiguration message from a source eNB. Next it is determined whether it is necessary to switch radio access protocol versions, in step 820. For example, step 820 may comprise determining whether the connection reconfiguration message comprises an indication of a required radio access protocol version to which the UE is to be reconfigured. If it is determined that it is necessary to switch radio access protocol versions, the method moves on to step 830, where radio access functionality introduced in radio access protocol versions later than the indicated required radio access protocol version is deactivated. Connection reconfiguration is then performed in step 840, and the method ends at step 850 with the establishment of a connection with the target eNB. Referring back to step 820, if it is determined that a radio access protocol version switch is not required, the method moves directly on to step 840 where connection reconfiguration is performed, and the method then ends at step 850 with the establishment of a connection with the target eNB.

Referring now to FIG. 9, there is illustrated a simplified example of a message sequence 900 for a handover request in accordance with some alternative example embodiments of the present invention. For the illustrated example, the message sequence 900 relates to part of a handover procedure for a wireless communication unit comprising UE 440 of FIG. 4 from a source network entity comprising base station transceiver (eNB) 424 to a target network entity comprising base station transceiver (eNB) 434.

The source eNB 424 sends a HANDOVER REQUEST message 910 to the target eNB 434 comprising an indication of at least one of a source network entity radio access protocol version and a wireless communication unit radio access protocol version, for example within a field, illustrated as protocolVersion field 912 forming part of a HandoverPreparationInformation message 914 contained within the HANDOVER REQUEST message 910. The target eNB 434 then returns a HANDOVER REQUEST ACK message 920 to the source eNB 424 comprising a connection reconfiguration message 924 containing an indication of a target radio access protocol version within a filed, illustrated as SwitchToProtocolVersion field 922.

For the example illustrated in FIG. 9, a radio link failure occurs between the source eNB 424 and the UE 440 before the source eNB 424 forwards the connection reconfiguration message 924 to the UE 440. Upon detection of the radio link failure, the UE 440 initiates a connection re-establishment procedure, whereby the UE searches for a suitable cell within which to connect. Upon finding a potential cell within which to connect, the UE performs an initial access procedure (not shown) and transmits a connection re-establishment request message to the eNB for that cell. If the source eNB had previously initiated handover preparations with the eNB for that cell, then that eNB may accept the connection re-establishment and return a connection re-establishment message to the UE. Accordingly, for the illustrated example the UE 440 transmits a connection re-establishment request message 930 to the target eNB 434. Since the source eNB 424 had initiated handover preparations with the target eNB 434, the target eNB 434 accepts the re-establishment request and returns a connection re-establishment message 940 to the UE 440. In accordance with some example embodiments of the invention, the target eNB 434 adds an indication of the target radio access protocol within a field, illustrated as switchToProtocolVersion field 942, of the re-establishment message 940.

Upon receipt of the indication of a required radio access protocol version to which it is to be configured, which for the illustrated example embodiment is received within the connection re-establishment message 940, the UE 440 is arranged to deactivate radio access functionality introduced in radio access protocol versions later than the indicated required radio access protocol version. In this manner, radio access functionality introduced in later radio access protocol versions may be deactivated within the UE 440 without the need to explicitly identify such functionality. For the example illustrated in FIG. 9, once the UE 440 has deactivated radio access functionality introduced in radio access protocol versions later than the indicated required radio access protocol version, and all other required reconfiguration, it sends a connection re-establishment complete message 950 back to the target eNB 434, and the connection re-establishment procedure is completed.

For the example embodiments illustrated in FIGS. 5 to 9, the indication of a required radio access protocol version to which a wireless communication unit is to be reconfigured has been sent to the wireless communication unit as part of a handover procedure, or a connection re-establishment procedure following a radio link failure during a handover procedure in the case of FIG. 9. However, the present invention is not limited to implementation within a handover procedure or connection re-establishment procedure, but may equally be applied to any situation in which a wireless communication unit is (or may be) required to reconfigure its radio access protocol functionality.

Figure 10:
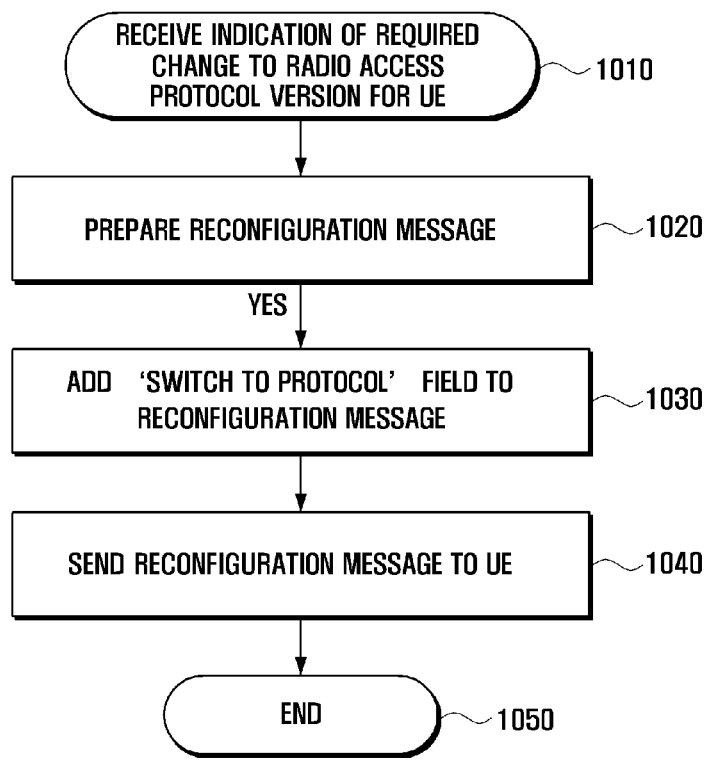
FIG. 10 illustrates an example of a simplified flowchart of a method for configuring radio access functionality of a wireless communication unit according to some alternative example embodiments of the present invention.

By way of example, FIG. 10 illustrates an example of a simplified flowchart 1000 of a method for configuring radio access functionality of a wireless communication unit according to some alternative example embodiments of the present invention. The method of FIG. 10 may be performed by a network entity within the wireless communication network 400 of FIG. 4, such as by signal processing logic 426, 436 of one of the eNBs 424, 434 by way of executable program code stored in a respective memory element 428, 438.

The method starts at step 1010 with receipt of an indication that a change of radio access protocol version is required for a UE. For example, it is contemplated that (in future generations of wireless communication systems) a radio access network entity may receive an indication that a UE is required to 'rollback' to an earlier radio access protocol version, or simply to support a specific radio access protocol version. Next, in step 1020, a reconfiguration message is prepared, and a SwitchToProtocol field is added to the reconfiguration message in step 1030. The reconfiguration message is then sent to the UE at step 1040, and the method ends at step 1050.

Referring now to FIG. 11, there is illustrated an example of an ASN.1 (Abstract Syntax Notation One) extract 1100 for signaling details for a HandoverPreparationInformation message comprising a protocolVersion field 1112, such as may be used within the HANDOVER REQUEST message 510 within message sequence 500 of FIG. 5.

Referring now to FIG. 12, there is illustrated an example of an ASN.1 (Abstract Syntax Notation One) extract 1200 for signaling details for an RRCConnectionReconfiguration message comprising a switchToProtocolVersion field 1222, such as may be used within the HANDOVER REQUEST ACK message 520 within message sequence 500 of FIG. 5.

Referring now to FIG. 13, there is illustrated an example of an ASN.1 (Abstract Syntax Notation One) extract 1300 for signaling details for an RRCConnectionReestablishment message comprising a switchToProtocolVersion field 1342, such as may be used for the RRCConnectionReestablishment message 940 within message sequence 500 of FIG. 5.

Referring now to FIG. 14, there is illustrated an example of wireless communication unit radio access functionality 1400, such as functionality within UE 440. The wireless communication unit functionality 1400 comprises general control unit 1410 arranged to handle layer 3 protocol functionality, such as receiving and processing radio resource control (RRC) messages, as well as the preparation and sending of RRC messages. The Universal Mobile Telecommunications System (UMTS) Radio Resource Control Protocol is defined in 3GPP TS 25.331. In accordance with some of the example embodiments of the present invention hereinbefore described, the general control unit 1410 may be arranged to handle reception of the switchToProtocolVersion field and to configure the other functional units accordingly. The wireless communication unit functionality 1400 further comprises a measurement unit 1420, arranged to perform the measurements that are configured by the radio access network, a security unit 1430, arranged to perform the integrity protection for signaling radio bearers (SRBs), the ciphering for radio bearers as well as the associated key derivations, and a radio access unit 1440, arranged to handle the layer 1 and layer 2 functionality of the radio access protocols.

Figure 15:
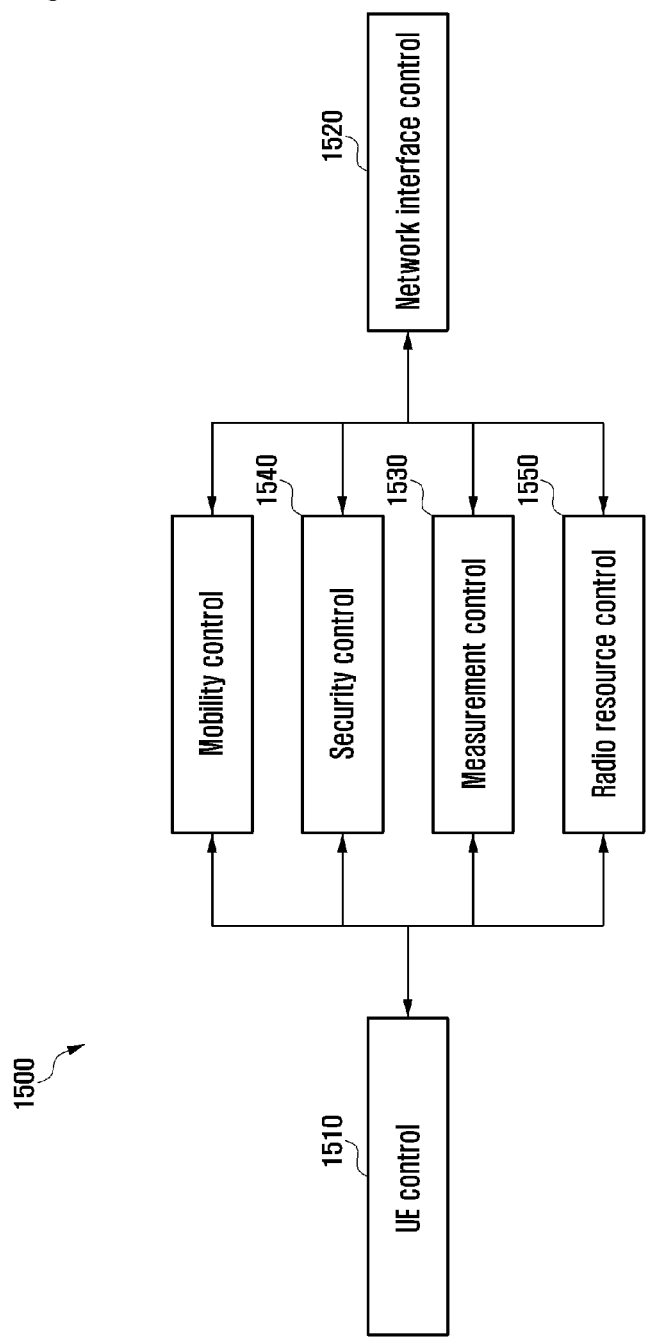
FIG. 15 illustrates an example of radio access functionality for a radio access network entity according to some example embodiments of the invention.

Referring now to FIG. 15, there is illustrated an example of radio access functionality 1500 for a radio access network entity such as an eNB. The radio access functionality 1500 comprises UE control unit 1510 arranged to handle layer 3 radio access protocol functionality, such as receiving and processing radio resource control (RRC) messages, as well as the preparation and sending of RRC messages. In accordance with some of the example embodiments of the present invention hereinbefore described, the UE control unit 1510 may be arranged to handle setting and sending of the switchToProtocolVersion field. Network interface control unit 1520 is arranged to handle similar functions for network interfaces. Measurement control unit 1530 is arranged to handle configuration of measurement functions in the UE and the eNB. Security control unit 1540 is arranged to handle the configuration of security functions of the radio access, such as integrity protection and ciphering. Radio resource control unit 1550 is arranged to handle configuration of the layer-1 and layer-2 functionality of the radio access protocols.

A possible disadvantage of using a need OR is that if the concerned functional extension upon handover is to be continued, it needs to be signaled thereby increasing the size of the handover message. This increase can however easily be avoided by having another optionality bit with need ON, one level below. In such a case 2 bits would need to be signaled to continue the functional extension. This approach is illustrated by an example, as shown in FIG. 17.

Although some aspects of the invention have been described with reference to their applicability to a UMTS (Universal Mobile Telecommunication System) cellular communication system and in particular to a cellular communication system comprising a E-UTRAN, it will be appreciated that the invention is not limited to this particular cellular communication system. It is envisaged that the concept described above may be applied to any other cellular communication system comprising a plurality of radio access protocol versions.

Figure 16:
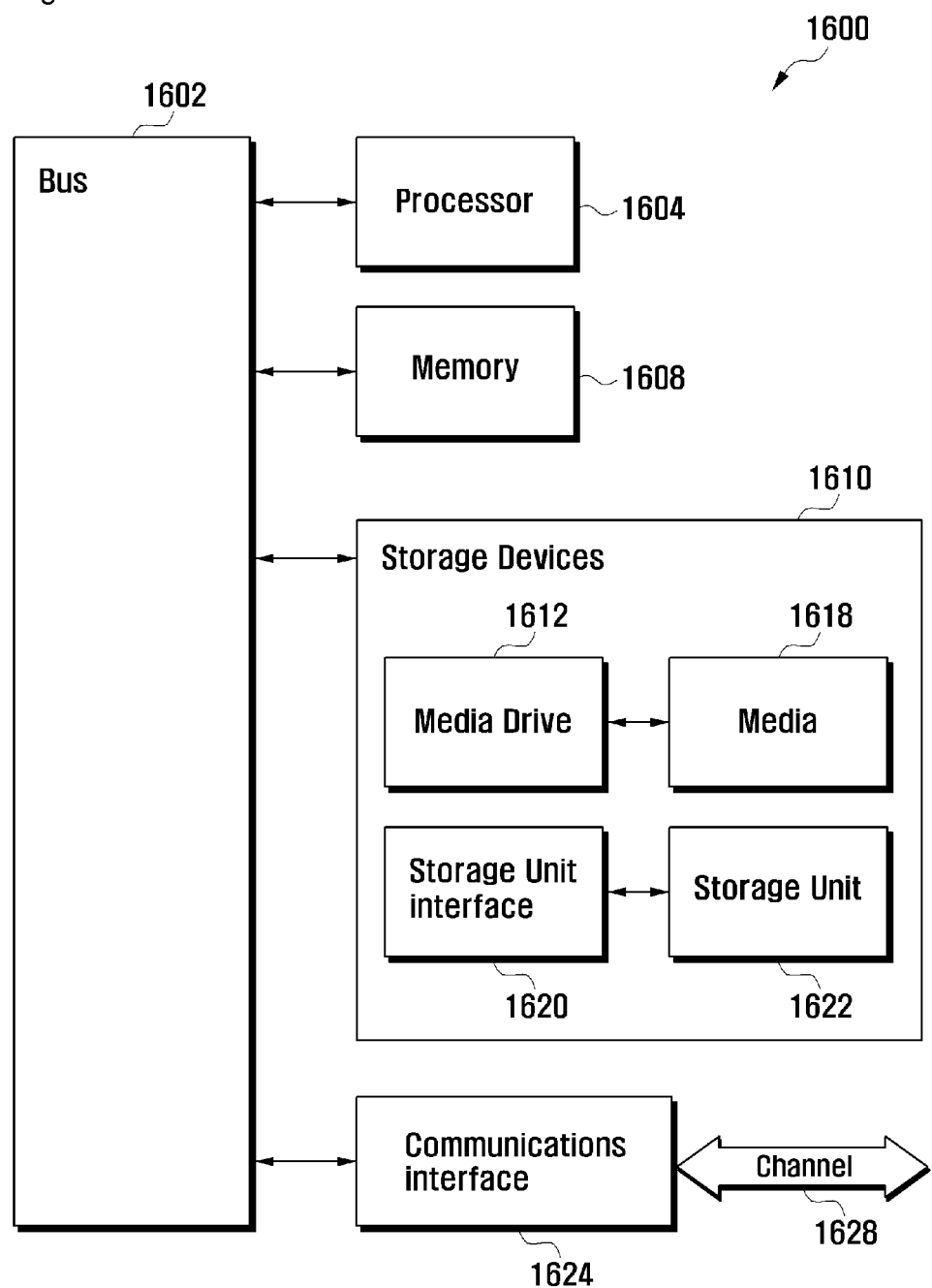
FIG. 16 illustrates an example of a computing system that may be employed to implement signal processing functionality in example embodiments of the invention.

Referring now to FIG. 16, there is illustrated an example of a computing system 1600 that may be employed to implement signal processing functionality in example embodiments of the invention. Computing systems of this type may be used in radio access network entities such as base transceiver stations and wireless communication units. Those skilled in the relevant art will also recognize how to implement the invention using other computer systems or architectures. Computing system 1600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1600 can include one or more processors, such as a processor 1604. Processor 1604 can be implemented using a general or special-purpose processing engine such as, for example, a microprocessor, microcontroller or other control module. In this example, processor 1604 is connected to a bus 1602 or other communications medium.

Computing system 1600 can also include a main memory 1608, such as random access memory (RAM) or other dynamic memory, for storing information and instructions to be executed by processor 1604. Main memory 1608 also may be used for storing temporary variables or other intermediate information during execution of instructions to be executed by processor 1604. Computing system 1600 may likewise include a read only memory (ROM) or other static storage device coupled to bus 1602 for storing static information and instructions for processor 1604.

The computing system 1600 may also include information storage system 1610, which may include, for example, a media drive 1612 and a removable storage interface 1620. The media drive 1612 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1618 may include, for example, a hard disk, floppy disk, magnetic tape, optical disk, CD or DVD, or other fixed or removable medium that is read by and written to by media drive 1612. As these examples illustrate, the storage media 1618 may include a computer-readable storage medium having particular computer software or data stored therein.

In alternative example embodiments, information storage system 1610 may include other similar components for allowing computer programs or other instructions or data to be loaded into computing system 1600. Such components may include, for example, a removable storage unit 1622 and an interface 1620, such as a program cartridge and cartridge interface, a removable memory (for example, a flash memory or other removable memory module) and memory slot, and other removable storage units 1622 and interfaces 1620 that allow software and data to be transferred from the removable storage unit 1618 to computing system 1600.

Computing system 1600 can also include a communications interface 1624. Communications interface 1624 can be used to allow software and data to be transferred between computing system 1600 and external devices. Examples of communications interface 1624 can include a modem, a network interface (such as an Ethernet or other NIC card), a communications port (such as for example, a universal serial bus (USB) port), a PCMCIA slot and card, etc. Software and data transferred via communications interface 1624 are in the form of signals which can be electronic, electromagnetic, and optical or other signals capable of being received by communications interface 1624. These signals are provided to communications interface 1624 via a channel 1628. This channel 1628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 1608, storage device 1618, or storage unit 1622. These and other forms of computer-readable media may store one or more instructions for use by processor 1604, to cause the processor to perform specified operations. Such instructions, generally referred to as 'computer program code' (which may be grouped in the form of computer programs or other groupings), when executed, enable the computing system 1600 to perform functions of example embodiments of the present invention. Note that the code may directly cause the processor to perform specified operations, be compiled to do so, and/or be combined with other software, hardware, and/or firmware elements (e.g., libraries for performing standard functions) to do so.

In an example embodiment where the elements are implemented using software, the software may be stored in a computer-readable medium and loaded into computing system 1600 using, for example, removable storage drive 1622, drive 1612 or communications interface 1624. The control module (in this example, software instructions or computer program code), when executed by the processor 1604, causes the processor 1604 to perform the functions of the invention as described herein.

In summary, examples of methods and apparatus have been described in which a radio access network entity such as a base transceiver station (or eNodeB in E-UTRA parlance), is able to indicate to a wireless communication unit to switch back to an earlier version of the radio access protocol, such that, upon receipt of such a command, the wireless communication unit deactivates all functionality that the wireless communication unit has activated which is defined in versions of the radio access protocol later than that to which it has been indicated to switch back to.

Whilst not limited to use within a handover procedure, the present invention advantageously provides at least some of the following benefits over possible solutions currently available:

(i) additional handover delay introduced through the source eNB deactivating functionality introduced in later protocol versions that that supported by the target eNB is substantially avoided;

(ii) the target eNB is able to cause the UE to deactivate unsupported functionality without the need for the target eNB to explicitly signal deactivation of such functionality;

(iii) the need for all fields to always be included within signaling for functionality that is required to b continued following handover (as would be required if all functionality defined using optional fields with need code set to OR), and the associated signaling overhead, is substantially avoided; and (iv) the need to significantly extend a radio access protocol, such as to define multiple default values as would be required to support switching to default configurations, is substantially avoided.

Aspects of the invention may be implemented in any suitable form including hardware, software, firmware or any combination of these. Aspects of the invention may optionally be implemented, at least partly, as computer software running on one or more data processors and/or digital signal processors or configurable module components such as field programmable gate array (FPGA) devices. Thus, the elements and components of an example embodiment of the invention may be physically, functionally and logically implemented in any suitable way. Indeed, the functionality may be implemented in a single unit, in a plurality of units or as part of other functional units.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described example embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved method for configuring radio access functionality of a wireless communication unit and mechanism therefor have been described, wherein the aforementioned disadvantages with prior art arrangements have been substantially alleviated.

The invention claimed is:

1. A method for configuring radio access functionality of a wireless communication unit within a wireless communication network, the method comprising, at a target radio access network entity:
   receiving a handover request for the wireless communication unit from a source network entity, the handover request comprising a radio access protocol version of the source network entity; and
   sending to the source network entity an indication of a required radio access protocol version to which the wireless communication unit is to be reconfigured, the indication of a required radio access protocol version determined based on the handover request and a supported radio access protocol version of the target radio access network entity, wherein the wireless communication unit deactivates at least one function based on the supported radio access protocol version of the target radio access network entity, if the radio access protocol version of the source network entity is higher than the supported radio access protocol version of the target radio access network entity.

2. The method of claim 1 wherein the method further comprises:
sending to the wireless communication unit an indication of a target radio access protocol version to which the wireless communication unit is to be configured.

3. The method of claim 2 wherein the method further comprises:
determining, upon receipt of the handover request, at least one of:
a source network entity radio access protocol version;
a wireless communication unit radio access protocol version; and
if the at least one determined source network entity radio access protocol version or wireless communication unit radio access protocol version comprises a version later than a supported radio access protocol version, the method further comprises sending to the wireless communication unit an indication of the target radio access protocol version to which the wireless communication unit is to be configured.

4. The method of claim 3 wherein the method further comprises:
upon receipt of the handover request, determining the source network entity radio access protocol version and the wireless communication unit radio access protocol version; and
if the source network entity radio access protocol version and the wireless communication unit radio access protocol version comprise versions later than the supported radio access protocol version, sending to the wireless communication unit an indication of the target radio access protocol version to which the wireless communication unit is to be configured.

5. The method of claim 4 wherein determining at least one of a source network entity radio access protocol version and a wireless communication unit radio access protocol comprises:
reading a field within a received HANDOVER REQUEST message; the field being arranged to comprise an indication of at least one of:
a supported radio access protocol version for a source network entity from which the handover request was received;
a supported radio access protocol version for the wireless communication unit; and
a latest radio access protocol version in which active functionality of the wireless communication unit is introduced.

6. The method of claim 4 wherein determining a source network entity radio access protocol version comprises:
looking up, within Operation and Maintenance (O&M) configuration information, a supported radio access protocol version for a source network entity from which the handover request was received.

7. The method of claim 3 wherein determining at least one of a source network entity radio access protocol version and a wireless communication unit radio access protocol comprises:
reading a field within a received HANDOVER REQUEST message; the field being arranged to comprise an indication of at least one of:
a supported radio access protocol version for a source network entity from which the handover request was received;
a supported radio access protocol version for the wireless communication unit; and
a latest radio access protocol version in which active functionality of the wireless communication unit is introduced.

8. The method of claim 7 wherein the field within the received HANDOVER REQUEST message forms a part of a HandoverPreparationInformation message contained within the HANDOVER REQUEST message.

9. The method of claim 3 wherein determining a source network entity radio access protocol version comprises:
looking up, within Operation and Maintenance (O&M) configuration information, a supported radio access protocol version for a source network entity from which the handover request was received.

10. The method of claim 2 wherein the target radio access protocol version of which an indication is sent to the wireless communication unit comprises a latest supported radio access protocol version.

11. The method of claim 2 wherein the target radio access protocol version of which an indication is sent to the wireless communication unit comprises a latest supported radio access protocol version from a subset of radio access protocol versions.

12. The method of claim 2 wherein sending to the wireless communication unit an indication of a target radio access protocol version to which the wireless communication unit is to be configured comprises:
adding the indication of the target radio access protocol within a field of a connection reconfiguration message to be contained within a HANDOVER REQUEST ACK message returned to the source network entity.

13. The method of claim 2 wherein sending to the wireless communication unit an indication of a target radio access protocol version to which the wireless communication unit is to be configured comprises:
adding the indication of the target radio access protocol within a field of a connection re-establishment message to be sent to the wireless communication unit in response to receiving a connection reestablishment request message from the wireless communication unit.

14. The method of claim 1 wherein the method comprises:
receiving an indication of a required change to a radio access protocol version for which the wireless communication unit is configured to comply with; and
sending to the wireless communication unit an indication of a required radio access protocol version to which the wireless communication unit is to switch to.

15. The method of claim 1 wherein the wireless communication network comprises an evolved universal terrestrial radio access network (E-UTRAN).

16. A non-transient computer program product comprising executable program code for configuring radio access functionality of a wireless communication unit within a wireless communication network, the executable program code configured to receive a handover request for the wireless communication unit from a source network entity the handover request comprising a radio access protocol version of the source network entity and to send to the source network entity an indication of a required radio access protocol version to which the wireless communication unit is to be reconfigured, the indication of a required radio access protocol version determined based on the handover request and a supported radio access protocol version of the target radio access network entity, wherein the wireless communication unit deactivates at least one function based on the supported radio access protocol version of the target radio access network entity, if the radio access protocol version of the source network entity is higher than the supported radio access protocol version of the target radio access network entity.

17. A network entity for supporting radio access to a wireless communication network, the network entity comprising:

a signal processing module configured to receive a handover request for a wireless communication unit from a source network entity the handover request comprising a radio access protocol version of the source network entity and to send to the source network entity an indication of a required radio access protocol version to which the wireless communication unit is to be reconfigured, the indication of a required radio access protocol version determined based on the handover request and a supported radio access protocol version of the target radio access network entity, wherein the wireless communication unit deactivates at least one function based on the supported radio access protocol version of the target radio access network entity, if the radio access protocol version of the source network entity is higher than the supported radio access protocol version of the target radio access network entity.

\* \* \* \* \*